United States Patent
Rosenfeld (12)

(10) Patent No.: US 6,312,191 B1
(45) Date of Patent: Nov. 6, 2001

(54) SELF-CONTAINED ECOLOGICAL WATERING SYSTEM

(76) Inventor: Bernardo Raul Rosenfeld, Thames 1929 PB (1414), Bue.As. (AR), 1414

( * ) Notice: Subject to any disclaimer, the term of this patent is extended or adjusted under 35 U.S.C. 154(b) by 0 days.

(21) Appl. No.: 09/424,461

(22) PCT Filed: Jun. 1, 1998

(86) PCT No.: PCT/ES98/00157

§ 371 Date: Mar. 7, 2000

§ 102(e) Date: Mar. 7, 2000

(87) PCT Pub. No.: WO98/54953

PCT Pub. Date: Dec. 10, 1998

(30) Foreign Application Priority Data

Jun. 5, 1997 (AR) .......................................... P9701-02460

(51) Int. Cl.$^7$ .................................................. A01G 25/00
(52) U.S. Cl. .......................... 405/37; 405/39; 137/78.3; 137/142; 239/63; 239/67; 239/562
(58) Field of Search ..................... 405/36, 37, 39, 405/40, 41, 43, 44, 45, 51; 137/78.3, 78.1, 142, 145; 239/67, 69, 63, 303, 550, 562, 565, DIG. 15

(56) References Cited

U.S. PATENT DOCUMENTS

| | | | |
|---|---|---|---|
| 4,321,937 | * | 3/1982 | Littlehale ................. 239/63 |
| 4,456,176 | * | 6/1984 | Agius ...................... 239/142 |
| 4,685,827 | * | 8/1987 | Sibbel ....................... 405/37 |
| 5,337,957 | * | 8/1994 | Olson ........................ 239/63 |
| 5,740,031 | * | 4/1998 | Gagnon .................... 137/78.3 |
| 5,971,294 | * | 10/1999 | Thompson et al. ............. 239/69 |

* cited by examiner

Primary Examiner—David Bagnell
Assistant Examiner—Frederick L. Lagman (57) ABSTRACT

Self-contained ecological watering system, protected against obturations, and capable of irrigating at low cost uniformly and regularly a variety of cultivated areas; the system operates automatically a series of fertirrigation cycles requiring minimum actuation power and reduced water flow rate. The system permits implementation of various configuration including a plurality of local subsystems (1) which are controllable locally or from a remote station (6); each subsystem comprises a container (2) capable of accumulating the volume of liquid to be discharged per cycle, a watering assembly (3) capable of regulating the watering volume and discharging it upon receiving a low power signal; a low consumption electronic control unit (4) capable of determining the frequency and the appropriate time to send said signal; and a low restriction distribution network (5) capable of transporting the water to irrigate the locations in need.

7 Claims, 4 Drawing Sheets

SELF-CONTAINED ECOLOGICAL WATERING SYSTEM

FIELD OF THE INVENTION

The present Invention belongs to the technical area corresponding to systems for located irrigation, also called microirrigation field.

In particular, it proposes itself as new alternative of adaptative and sustainable technology, against other well-known microirrigation systems, characterized by the possibility of operating automatically watering, according to the necessities of the ambient, the man and the cultivations, with accent in natural resources saving and energy autonomy.

INTRODUCTION

The necessity of new and better solutions to the feeding of the vegetable species cultivated in the planet, is affected nowadays by opposed tendencies.

On one hand, the growing alimentary demand of a world population that has not stopped to expand, has taken to use new technologies in order to forcing the productive yield of lands on the edge of exhaustion, as well as to extend the frontiers from the agriculture to areas before rejected.

On the other hand, the disposition of elementary natural resources as soil, water and air was narrowed, as a consequence not only of the demographic growth but also due to environmental contamination and negligent uses, increased by degrading effects in the climate.

When being definitively lost or deteriorated an important part of the natural wealth, is no longer so easy to use indiscriminate or unilaterally the essential resources, not even with the intention of satisfying those requirements.

Therefore, it is imposed to qualify well-known or new solutions, strictly based on a conception of the planet as ecosystem.

If being affirmed the present tendency to reduce agrochemicals use toward a more organic agriculture, it will surely imply a more rational employment of natural factors, to service the global necessities of the ecosystem.

So, while water able for feeding human or vegetable is becoming a scarce resource, still in traditionally favored regions, it arises as a high-priority necessity to solve the problem of watering with rigorous efficiency approaches for savings on the element and its use.

A second requirement of current validity is to include the so called "fertigation" that takes advantage of the hydraulic road to incorporate fertilizers, medications and other chemicals in the most economic form. This acquires special importance in the exploitation of over used lands.

A third important necessity refers to the economic use of sandy or loamy composition soils, where the nutrients shortage is intrinsic.

A fourth emergent phenomenon, related with those formerly exposed, consists in the saline problem, involving three aspects: to recover soils very much exploited from deep salinization; to incorporate as crops lands, areas traditionally rejected by their saline content, and finally the feasibility of watering with brackish water, when it is the only one locally available.

A fifth necessity arises from the increasing tendency to automate certain agricultural systematic operations with the intention of improving and regulating productive results, so much when the cultivations are carried out covered in modern greenhouses, as when the goal is to diminish climatic risks, to reduce heavy human tasks and to improve results cultivations yields. Said "fertigation" techniques are particularly able to be automated with advantage, but until the present it has implied high costs, maintenance inconveniences, bigger energy consumption and cultural difficulties for their adoption.

A sixth necessity refers to the emergent market of non-assisted watering of home gardens or alike, more and more extended in the breast of big cities possibly as a compensatory tendency to their characteristic contamination and excessive population living there.

In the current state of the technique—that will be referred detailedly in the following paragraph—the mentioned necessities are far from being integrally satisfied, still considering the last and well-known advances in located watering, as for example drip and trickle irrigation.

It is in said context that the present Invention appairs, providing a Self-sustained Ecological Irrigation System able to assure an appropriate feeding to the cultivations, based on a significant resources economy and also giving answer to the other outlined requirements.

To achieve those results, it combines traditional technical resources, as for example gravity liquid conduction and distribution with more modern technical resources as for example employment of distribution networks implemented with low cost and simple manipulation plastic pipe; with further more recent technology resources as for example the programmable intelligent command module acting automatically in close-loop mode by means of sensors; and finally with special innovative resources, as the incorporation of an hydraulic discharge valve able of working with big flows using very tiny energy.

Summarily, the Invention in a basic configuration comprises at least a self-sustained ecological irrigation sub-system feeding a limited cultivation sector having homogeneous requirements, assisting it automatically during an indefinite period that could embrace the complete evolutionary cycle of the referenced vegetable species.

The Invention operates periodically along a cycle—generally daily preferable—comprising a first preparation sub-cycle embracing most of time of the total period, followed by a second discharge sub-cycle with relatively shorter duration, finally restarting the cycle from its beginning.

Said preparation sub-cycle is employed to accumulate in a deposit the total volume of water to be discharged per cycle, through a minimum flow rate. After reaching the preset maximum level, the System rests in a wait state. Additionally, a mechanism of triggered discharge is prepared, accumulating potential energy in the form of pressurized air, into a special configuration of hydroneumatic siphon device.

This preparation sub-cycle is also employed by the Invention to integrate in an integrator mean, incoming electric power for example generated by a photovoltaic convertor, so dimensioned to guarantee—with the aid of energy storage means—the uninterrupted operation in the most unfavorable conditions.

A command circuit determines from preset conditions the adequate moment to the discharge and executes it by sending a reduced energy impulsive electric signal to a pneumatic trigger device that evacuates said pressurized air, causing a high flow discharge until emptying the deposit in few minutes. Doing so, the beginning of a new cycle is immediately enabled.

The discharge is driven through a low restriction distribution network, in which the major hydraulic loss is spread between the located emission holes whose diameter is about some millimeters. It determines a relatively uniform space distribution, without the intrinsic obturation dangers of other narrow passage restrictors.

STATE OF THE ART

If one observe the fundamental tendency with which the watering methods had historically evolved, as human inventive exercise to increase the production of foods palliating climate risks or the characteristics of the cultivated land, a progressive tendency can be identified, toward a more and more precise application—in spatial, rythm and volume terms—with the consequent water savings.

On the other hand, this techniques have evolved imitating the two natural phenomenons that provide useful irrigation water: rivers and rains.

First of all, antique systems as dams, aqueducts, channels and furrows were perfected, integrating the so called surface watering in reference to the application form; or by gravity referring to the type of energy that impels the liquid toward its destination.

Then, the mechanical advances that characterized the first half of the present century, allowed the directed emulation of precipitations by means of fixed powered sprayers. These facilities, where the water is piped and pressure impelled, allowed to increase watering efficiency essentially by reduction of the distribution losses. Among the last achievements of this technical group the one denominated central pivot watering stands out, being able to feed circular areas with radius of some hundreds meters by rotating a motorized line of sprayers, or the even more complex front advance system comprising powerful self-mobile pumps.

The mentioned systems had been employed successfully when the water abundance or the public support of the financial efforts to build the hydraulic base installations, didn't impose strict limits to their private feasibility. In what relates with spraying systems, the significant consumption of energy in terms of transport and drive could be financed especially in advanced or developed countries, as direct consequence of fuel availability and/or rural electrification.

However, a new generation of watering systems was originated by severe restrictive conditions, together to the necessity of a bigger control on the evolution of the crops: the High Frequency Located Watering (microirrigation) systems.

Comprising basically techniques like drip irrigation, micro-aspersion and porous transpiration pipes; and directed originally to achieve a more precise application of the water, these equipments were only possible based on the last plastic industry advances that allowed to manufacture in great volume series, engineered pieces of intricate design made with new, high environmental resistance materials, at comparatively low cost.

These methods carry the water practically to the plant root, by means of sophisticated miniaturized emitters, fed by a net of small section conduits and employing relatively low pressure. They implied not only quantitative improvements in watering efficiency—particularly in case of permanent roots species—, but rather produced a true agriculture revolution[1], founding new cultivation methods and expanding the arable areas over former rejected areas.

Surely, the most influential and more extended system has been the first one. It is convenient in order to detail art previous to the present Invention, to closely examine the drip method.

It is known the fact that the first invention patents referred to Drip Irrigation industrially realized, have been originated in the State of Israel, where the vital necessity to transform the desert into crop area, could be conjugated with a high technological level based on other necessities.

At the moment when the Drip technique arose, the agronomic aspects of watering had already been object of profuse investigation for a lot of different species. The concepts of irrigation efficiency could be refined, discriminating its various aspects.

Been focused from the scope of hydraulic distribution, the use of water for the cultivation, or accenting in the energy cost of the feeding; it was already possible to quantify projects with sufficiently predictable results. It was developed, then, a watering method that tried to strictly adapt—in physiologic and economic sense—to that required by the cultivation in a scenario characterized by the shortage of water.

The heart of the method of the Drip Irrigation is the emitter or dripper, miniature piece of hydraulic engineering generally plastic injected, able to be massive manufactured at relatively low cost.

Functionally, the typical evolved dripper is a pressure and flow reducer device achieving very high hydraulic losses, with a fixed a lineal response to input pressure of the exponential type using generally fractional exponents, specified by a nominal quantity of emitted flow, commonly of about 1 and 10 liter/hour for a standard input range of feeding pressures between 5 and 50 meters of water column height.

The main contribution of the Drip method is apparently simple: important water savings because of spatially uniform located distribution of the input flow to the cultivated area; with low investment and energy consumption as compared with traditional methods.

Gravitating precisely this factors of efficiency in the economic feasibility of certain cultivations or the use of wide areas, the employment of the referred method became a decissive key factor.

The immediate effect of dripping or other located waterings over a cultivation is generally a better production, with a savings of about the 50% in the used water. Their growing expansion is due to this advantage that has demarcated a before and a later especially in what refers to intensive agriculture, powerfully influencing the permanent root cultivations but also those of shorter cycle as vegetables and flowers.

A secondary advantage of utmost importance became evident a little time after the appearing of these methods, related with the salinization problem.

After early experimental investigations[2], it was established that with certain flow levels and application frequencies, Dripping is able to produce a local salt wash out from the soil volume near to the root zone of plants, restoring gradually the original productivity in a quicker and more efficient way that with the "flood" practices former used.

In 1977 Bresler (USA)[3] described the method as creating a micro-zone near the emitting point called "humid bulb", its form and dimensions corresponding to the watering application regime an soil properties.

The fact that the plant adjusts its root configuration radicular to adapt inwardly to this humid bulb, gives place to an agriculture in which it is possible to improve a harmfully mineralized soil at low cost, at least in the small enclosure where the plant is inserted, and that this improvement is controllable up to will in agreement with the necessities of the cultivation.

It should be emphasized here that the mentioned work, comparing different soil structures and flows of the located watering, established that the most convenient form of said bulb was obtained applying relatively higher flow regimes for equal total volume amounts applied. Presently, this fact has been broadly proven and spread by the specialized literature.[4]

Indeed; the consequence of applying a higher instantaneous flow (as the provided by the present Invention) is a humid bulb of smaller vertical development and bigger horizontal expansion that the one generated by the Drip one, favoring the radial root development influencing a direct increase over the yield.

Later investigations, relating the formation of the humid bulb with the distribution in the saline concentration when being used the Drip watering method, demonstrated that the high frequency located application displaces the salts toward an outlying capsule that wraps around the bulb, but leaving enough space to provide a satisfactory root development.[5]

Again, it was revealed that this phenomenon results more effective with higher instantaneous flow applications.

In summary, the importance of the Drip watering method exceeds goes far away in the best water use, allowing the revaluation and use of the soil resource.

In large countries as the República Argentina that—in relative terms—is one of the world's lesser watered, only embracing 3% of the arable area[6]; presenting a soil salinization problem that reaches danger levels and significant extensions, the necessity of adopting a solution with these characteristics becomes more than evident.

However, and nevertheless the significant advantages previously explained, the practical implementation of the Drip watering technique has been revealing inconveniences of not so little importance, ending up to neutralize those advantages in certain situations, but also limiting against all that foreseen the tendency of its growing adoption.

The inconvenient is so simple but affects the heart of the method: the drip emitters are easily plugged.

The sources of this deletereous obturation phenomenon had been described as of inorganic origin (silts, salt precipitation) or organic one (formation of bacterias and/or microscopic algae colonies in low flow sectors of the net), this last phenomenon increased by the employment of liquid fertilizers in fertigation practices. For example, the main cause of massive obturations to microirrigation systems in Israel had been attributed to the growth of protozoaria colonies like Epystilys Balanarum or sulfur bacterias like Beggstoa Alba.[7]

With more reason, in less technological or cultural developed environments or with infrastructure carencies, difficulties have taken place with the Drip method. Such the case, for example, of that investigated among farmers of the state of Maharashtra, India.[8]

After the accumulated experience of numerous anomalous operating installations was of public domain, engineering correctives efforts were applied, in the intent of preserving the initial advantages of the technique.

Necessarily, the solution should be found as improvements in the dropper design, in order to conserve the technical and economic coherence of the method.

This way, the miniature labyrinths responsible for the functionality of emitters were redesigned, trying to palliate the inconvenience.

New concepts were developed, looking for achieving flow restriction based on hydraulic resistance self-induced by turbulent circulation, instead of the former undersizeing of emitter passages.

Special geometry entrance cavities were adopted, to contain the particles by way of low restriction hydrodynamic filtering.

However, the opposing solutions were only partial ones. The accumulation of particles was proven irreversible, and obtrutions only matter of time.

The problem was that the adding of vortex generators doesn't diminish, but rather gives place to a progressive growth of the deleterious deposits, making that the main property of the emitter i.e. its nominal emission flow, be changing along with the use as an uncertain time law. Finally, the phenomenon ends deteriorating the uniformity of space distribution, in fact the main advantage of the Method.

Indeed; the option among laminar flow restrictors that are aleatory plugged and vortex designs changing progressively with time couldn't be satisfactory.

Also the response uncertainty is increased by means of the initial emitter response as a normal statistical effect of its manufacturing. ISO standards, for example, categorizes emitters into at least two precision classes, according to the tolerance group to they belong, imposing a clear labelling of the product and obvious cost differentials.[9]

Starting from these difficulties, answers begun that go beyond the effort of improvement the system without deeper changes.

Emitters comprising detachable parts for their cleaning are proposed, but asking for specialized manpower and stops for maintenance. They are marketed, even, manually trimmable drippers.

Self-cleaning designs were registered, allowing inverse flow to remove plugging. Their use requires, however, additional devices like special valves or generators of that flow.

As the mentioned efforts were proven insufficient, it should be recognized the necessity of including in the facilities of Drip irrigation, expensive centralized equipment as precision high flow filtering stations, pressure regulators and flow integrators.

This instrumental, as for example the Woltman[10] turbine type, has errors of more than 2% and high load loss but becomes obligatory in dripping due to the impossibility of knowing with certainty the volume of water provided to the plantation as becomes impredecible the relationship between flow and pressure in the distribution network.

The necessity to justify the use of these expensive facilities, forces to employ a centralized configuration for the watering distribution network, with bigger costs dedicated to long conduits of important section, electrovalves, etc. Which in turn requires an appreciable energy consumption, harmful among other reasons because it bears a strong dependence of the cultivations to the electric lines or the fuel provision sources.

To this height of the present discussion, it can be already appreciated the partial limitations that affect the expansion of the Drip method of watering.

In the practice and because of plugging, the system is strongly affected by heterogeneous distributions and impredictable watering reductions, unless incorporating complex filtrate equipment, regulation of pressure spread along the net, flow measurement and alarm automatisms.

The theoretical feasibility of Dripping for fertigation and/or to use high sine content waters, dissapears when these practices increase the tendency to the pluging of emitters.

This way, the Drip method reveals itself as fragility affected, unless it is provided a sophisticated, expensive installation and linked to the electric power net or some other energy source.

So, become excluded from its application the lower developed regions of the world, in which the rural exploitation lacks of if structure and the socio-economic and cultural environment that appears as a must for this method's functionality. Significantly, those lands where efficient watering is more necessary.

Among the alternatives proposed against the Dripping's inherent difficulties, the intermittent or pulsating method could be remarked. A good example is Spencer's invention[11], that points in solving the problems caused by extremely restricted emitters.

To achieve this objective without losing the liquid savings achieved by the previous art, he appeals to obtain the reduced flow by acting on the so called integral cycle relationship, providing irrigation cycles each one comprising brief, high flow pulses, followed by relatively longer non watering intervals.

Using high line pressures, high-speed electrovalves and retention ones in conduits and emission openings, referenced invention is indeed able to attain reduced average flow—adjustable by modifying time relationships—but pulsing high instantaneous flow through bigger orifices.

The obturation risk is this way minimized, at the cost of more mechanization, complexity, mechanical wear out and an increased dependence respect the energy net.

A modern technology corrective approach is offered by Desrues et al[12], employing massive use of sensor local feedback and central computerized processing into closed-loop mode to achieve real time adaptation to the current conditions of the cultivation, compensating non uniformities in the watering dilution by means of multiple remote control of adressable electrovalves. Again a technically effective solution is from another point of view, an expensive, complex and of high energy consumption one.

Viewing the outlined scenario, it results in synthesis that the High Frequency Located Watering as a concept that prioritizes the uniform punctual distribution has been agronomic and economically better in reference to the conventional gravity or surface methods and powerful aspersion; but the industry has not provided yet general solutions comprising the variety of situations in which the agriculture works.

In highly agricultural extense regions within the so-called Third World, the rural lack of development turns impracticable the employment of electro-mechanic-intensive technologies.

Further more; due to the crisis of non renewable energy experienced by the planet in the last decades, even the agricultural sector of the relatively high developed countries becomes increasingly interested in technological improvements based on simple operation principles, low cost and extended useful life, reducing pollutants and enabling the higher attainable energy autonomy. Nevertheless, until the present Invention it didn't appeared a sufficiently integral and reliable solution for the problem of watering operating exclusively by means of solar energy.[13]

The ecological consistency enunciated at the beginning, remains therefore unfulfilled for the previous art of watering; situation that is in fact what comes to satisfy the present Invention, together with other objectives that are exposed in the following paragraph.

FINALITIES OF THE INVENTION

In the following lines, the purposes that the Invention executes are enumerated, grouped by aspect of interest The detailed description along with the enclosed drawings, illustrate the structural means and operation principles that the Invention employs to satisfy said requirements.

AGRONOMY
Flexible agronomic effectiveness for a wide spectrum of located cultivations.
Adaptability to different extensions and configurations of the irrigated area.
Fertigation feasibility.

RESOURCE: WATER
Maximum distribution and use efficiency of the resource.
Control and regulation of the volume of water given to the cultivation.
Predictable operation, even with irregular water input flow.
Capacity of automatic compensation to the cultivation for lapses of absolute drought.
Use of high saline content waters.

RESOURCE: SOIL
Use of, sandy loamy or low nutrients soils.
Use and/or recovery of salinized soils.

OPERATION—ECONOMY
Simple and intuitive operation.
Extended useful life with null or scarce maintenance.
Low risk of obturations without necessity of special filtering neither pressurization.
Reduced energy requirement.
Autonomy regarding the energy provision.
Configurations with different degrees of automation y/o remote control.
Selectable automatic or manual operation modes.
Automatic watering to open field or covered crops.
Domestic version: non assisted watering of homelike garden or small vegetable crops.
Reduced cost of the centralized irrigation equipment and the distribution network.
Controller optionally compatible with an already existent microirrigation net.

SUMMARY OF THE INVENTION

The enunciated finalities are exactly satisfied by the present Self-sustained Ecological Irrigation System that in a basic configuration with only a single local subsystem, comprises four main parts:
- a container with enough capacity to contain the total volume of water to discharge in each cycle;
- a positionable irrigation actuator device, able to first adjustably control the filling and then the pulsed discharge of the liquid accumulated in the container with a very low energy expense, thanks to a novel elechydro-pneumatic mechanism;
- a command module, generally of electronic nature with reduced electric consumption, able to trigger the operation of said actuator; and finally a distribution watering net able to distribute the total volume discharged with generally high and uniform flow, toward a plurality of localizations inside the cultivation area.

Summarily, the operation of the Invention comprises a first preparation phase that generally includes a stable wait state; followed by a second discharge or properly watering phase, generally taken place by the watering actuator when being triggered from the command module.

The liquid spreads quickly through the distribution network producing local watering by way of multiple emission of similar end flow; this end flow being only determined—for a given input flow—by the dimension relationship between emitter's and conduit's passages.

Because of said pulsed discharge principle triggered by a very low initiation energy, the operation of the system is generally independent of the electricity lines, operating dependably for example based on solar energy, being able however to discharge large volumes in a short time.

Lastly, it is this structure and operative principle what confers to the present Invention its application versatility, and the ample spectrum of configurations, control complexities and design variations with which can be industrially produced.

DESCRIPTION OF THE DRAWINGS

In order to better illustrate the structure and operation of the Invention, the following drawings are enclosed within the present memory.

STRUCTURAL DESCRIPTION OF THE INVENTION

The present Invention possesses a basic constituent structure that remains the same through the different realizations with which it can be embodied; or the variety of concrete situations to which is able to adapt its configuration and benefits.

Although the Invention as a watering system represents a novelty in reference to what is already known by means of its new characteristics, it includes an essential novel nucleus that makes it possible and which constitutes the true source of originality for the hole apparatus.

This novel nucleus resides in the configuration and operative form of the denominated local watering subsystem; and precisely in the so-called watering actuator.

The detailed definition of this unique, main object of the Invention and its corresponding hierarchical novelty structure, is the object of a special section of the present memory.

In order to better distinguish this basic structure, the Invention is described from a general to a particular scope, describing first the system, then the subsystems and finally the concrete subsets or devices including some preferred constructive and/or operative options.

Figure 1:
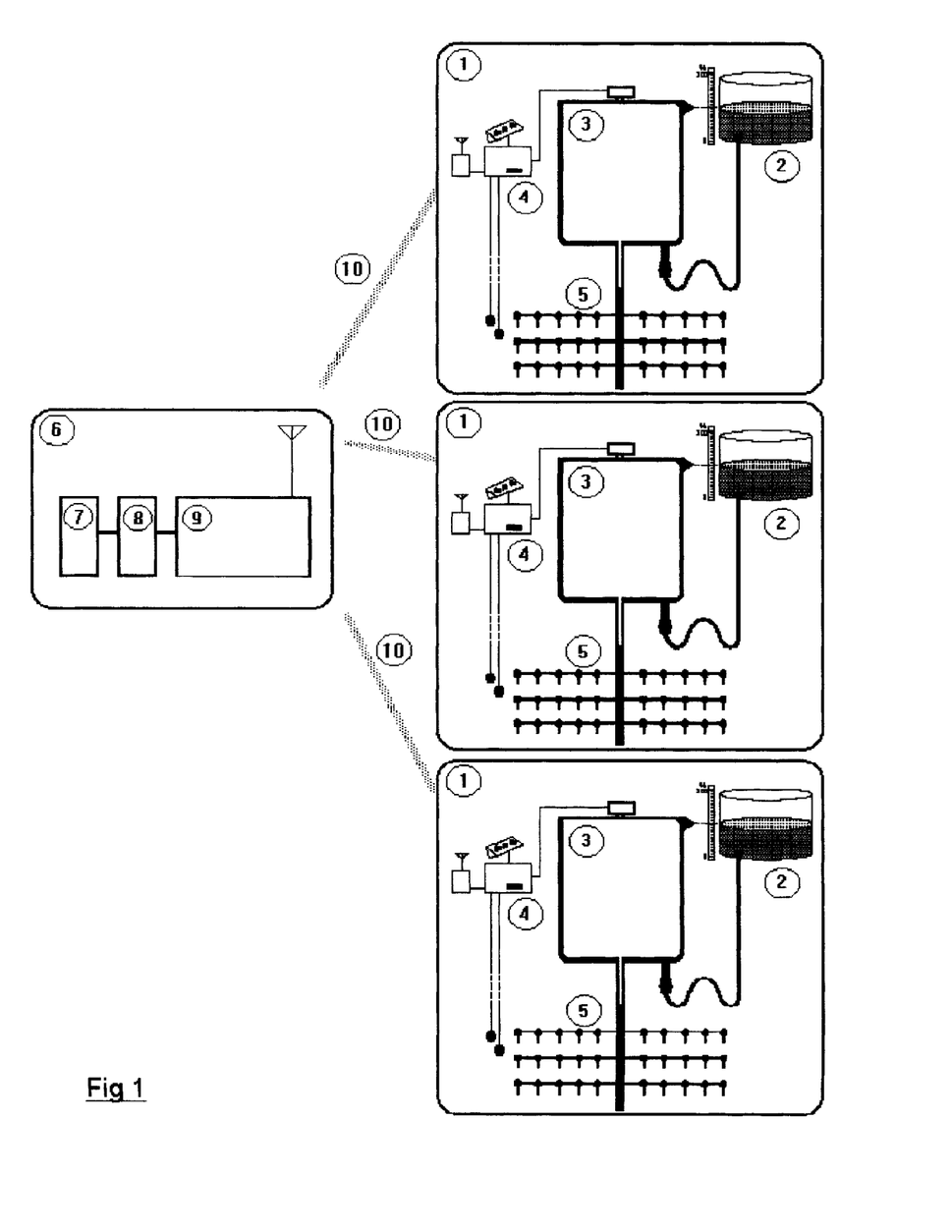
FIG. 1 functional outline of a preferred implementation of the Invention, according to a general configuration comprising a plurality of local subsystems.

This way, a general implementation of the Invention as illustrated in FIG. 1 comprises a system of programmable watering applied to an agricultural establishment of considerable extension with diversity of productive parcels, operating a plurality of decentralized units to water by demand adapting to each one of the particular situations.

As it is observed, this implementation comprises a plurality of local subsystems (1), each one of them watering an homogeneous characteristics cultivated sector, said local subsystems being water fed from the nearer source; and operating autonomously based on—for example—solar energy.

Said local subsystems (1) possess a common structure, comprising a water container (2), a positionable watering actuator assembly (3), a watering command assembly (4) and a watering distribution network (5).

On the other hand, a central control station (6) comprising a remote commands codifier circuit (7), a commands multiplexer circuit (8) pointing to each one of the local subsystems (1) and a remote control transmitter circuit (9) connected with said subsystems by means of a number of communication channels (10), is able to set or remotely modify certain operative parameters of the subsystems, according to that established by a human operator.

Said commands could be, for example: to enable or temporarily suspend the automatic watering; to modify the duration of cycles; to make asynchronously an additional watering cycle; to enable an automatic compensation for drought; or to enable the automatic incorporation of fertilizers, among others.

Figure 2:
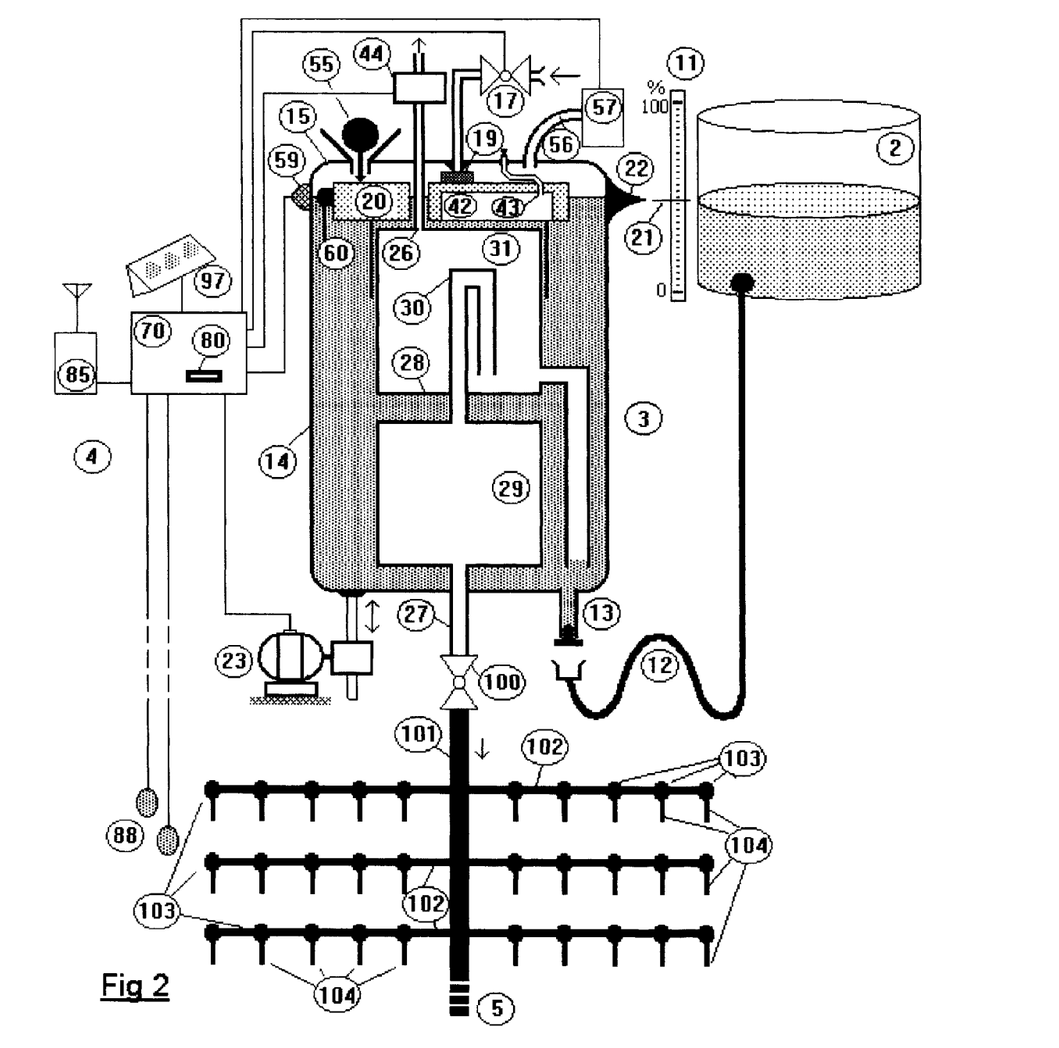
FIG. 2 functional outline of a preferred implementation of one of the local subsystems of the Invention, for a complete application.

FIG. 2 illustrates with more detail the preferred constitution of one of the mentioned local subsystems. It can be observed that comprises a watering liquid deposit or container (2) with enough capacity to contain the total volume of water to be discharged into a cycle, including a vertical ruler (11) graduated in capacity percentages or directly in units of volume, in concordance with the corresponding inside height of the liquid.

Said container (2), elevated a few meters in reference to the land level, possesses a flexible hydraulic connection (12) emergent from its bottom, able to communicate optionally with the positionable watering actuator assembly (3) through the capacity expansion shuttable connector (13), in order to extend the watering volume capacity of the subsystem until satisfying what required by the assisted cultivation.

The positionable watering actuator assembly (3), comprises a body consistent in a recipient of limited capacity (14), tightly closed by the top cover (15).

Said positionable watering actuator assembly (3) also comprises a filling controller subset (16), integrated by a controllable input flow regulator device (17) of the flow of liquid entering to the subsystem from an external source; a controlled level regulator (18) including a shut-off valve (19) acted by a controllable floating device (20) able to limit the filling level of the recipient (14) same as the liquid level inside the container (2), in the event of being both connected by means of the flexible hydraulic connection (12)—to a regulated filling level value (21). In coincidence with this level (21), a pointing device (22) fixed outwardly to the body (14), allows to establish the filling set point level, positioning vertically the positionable watering actuator assembly (3) according to that indicated by the pointing device (22) on the ruler (11). The positioning can be carried out manually or in automatic form by means of the vertical displacement servomechanism (23), acting on an appropriate point of the body (14).

Also included inside said body is the discharge actuator subset (24), comprising the hydro-pneumatic siphon device (25) having the air relief mg discharge control conduit (26); and the discharge conduit (27).

Figure 3:
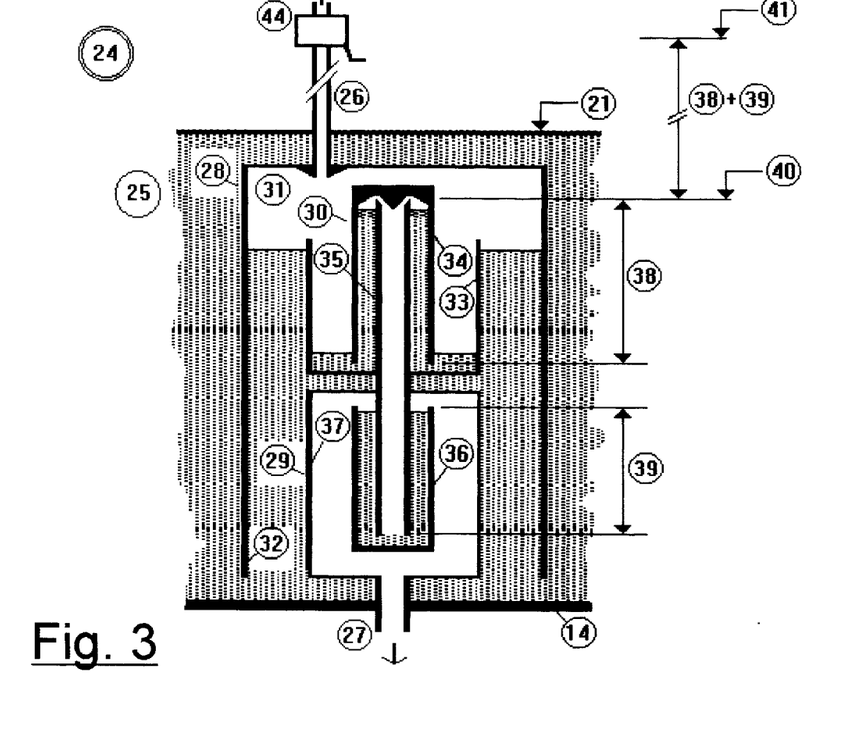
FIG. 3 schematic illustation of a preferred implementation of the discharge actuator subset.

Said hydro-pneumatic siphon device (25) is shown with more detail in FIG. 3, being seen that it comprises three hydraulically sequential parts, that is: an ascending or input sector including the supplementary input threshold device (28); a descending or discharge sector including the supplementary discharge threshold device (29) and an intermediate or elbow sector (30); comprising also a fourth pneumatic part connected in derivation with the described hydraulic circuit, consisting in a pressurized air camera (31), connected with the air relief discharge control conduit (26); the mentioned device (29) ending in the discharge conduit (27) mentioned above.

In the coaxial implementation of FIG. 3 configured by means of basic one-end opened recipient forms that can be told like glasses put in up or inverted position, it is observed that the supplementary input threshold device (28) consists on an external first inverted glass (32) whose mouth ends near the bottom of the recipient (14), including in its top half zone a second up glass (33), which in turn contains the elbow device (30) configured by a third inverted glass (34) and inside it, the exit tube (35) that extends vertically down, being inserted in the supplementary discharge threshold device (29)

Given the importance of its behavior in the particular way with which the Invention operates, it should be remarked here that the discharge transition camera comprised in the elbow device (30), consistent in the hydraulic passage among the bottom of the inverted glass (34) and the top end of the exit tube (35), possesses a hydrodynamic design setting a continuous transition between sections, in order to obtain a precise definition of what will be called the spontaneous discharge threshold, on the base of assuring a laminar flow circulation of the liquid through said elbow in the precise moment of transition to discharge. Said aspect can be clearly observed in the referenced drawing.

The higher zone of said first inverted glass (32) presents a pressurized air camera (31), being able its air to be evacuated through the discharge control conduit (26).

The exit tube (35) above mentioned, extends until almost touching the bottom of the up glass (36), contained in turn by the end glass (37), which communicates through its bottom end with the discharge conduit (27) already noted.

The described structure provides a plurality of pressure levels equivalent to potential energy thresholds that can be quantified for example in terms of units of water column height, those pressure levels being determined solely by certain dimensional relationships in the Invention's structure, being:

the supplementary input threshold UT (38), equal to the difference of height among the open end of the inverted glass (34) and the top end of the exit tube (35);

the supplementary discharge threshold UD (39), equal to the difference of height among the open end of the normal positioned glass (36) and the bottom end of said exit tube (35);

the transition discharge threshold of the elbow, here denominated level or threshold to basic spontaneous discharge UDB (40), generally equal to the absolute height of the top end of the exit tube (35); and the global spontaneous discharge threshold UDG (41), combining the performance of the previously mentioned devices and being equivalent to an absolute height equal to said basic spontaneous discharge threshold UDB (40), added with the other already defined values of supplementary thresholds:

UDG=UDB+(UT+UD) [units of H2O column height]

The controllable floating device (20) former mentioned, includes a section of controlled floating camera comprising at least a cavity (42), bottom opened and top closed, able to trap pressurized air as the liquid level in the recipient (14) ascends, so contributing to the push force acting the limitation of filling by means of the shut-off valve (19); the superior part of this cavity (42) being communicated by means of the flexible filling level control conduit (43) to allow the evacuation of said pressurized air, said conduit (43) emerging through the top cover (15) to communicate with a trigger device in order to produce the relief of pressurized air.

Tightly fixed in said top cover (15), there are control means, comprising at least a trigger discharge device (44).

Figure 4:
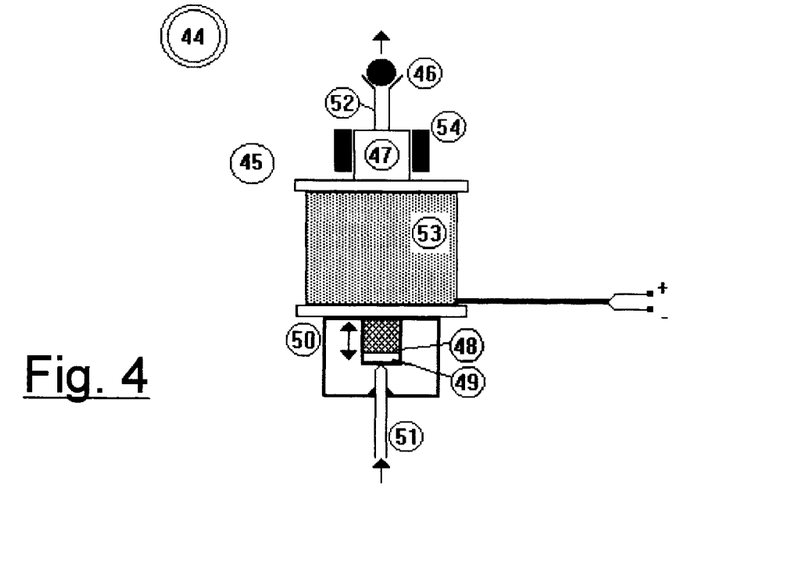
FIG. 4 schematic view of a preferred implementation of the triggering device.

For more descriptive detail, the preferred implementation illustrated in FIG. 4 may be observed. It can be seen that said trigger discharge device (44) comprises a pneumatic bistable electrovalve (45) providing retention in both opened or closed states, plus optionally disabled one-way or retention characteristic, by means of the pneumatic retention valve (46). Said electrovalve (45) includes a generally tubular hermetic room (47) inside which a generally cylindrical mobile nucleus (48) built with magnetic material, slips with low friction; the bottom end of this nucleus being covered with a thin resilient sealing layer (49).

In its bottom zone, the hermetic room (47) presents an enlargement that gives place to the action camera (50).

The input conduit (51), communicates the inside space of the mentioned hermetic room (47) with at least one of the controlled actuators (18) or (24) through the corresponding control conduits for relief of pressurized air, that is: the discharge control conduit (26); and/or the filling level control conduit (43). The top end of said input conduit (51) is sharpened, allowing a perfect sealing against the resilient sealing layer (49), thanks to the weight action of the mentioned mobile nucleus (48).

An exit air conduit (52) communicates the inside space of the tubular hermetic room (47) with the pneumatic retention valve (46), easily disabled by the user to configure the operative options.

Once opened, said valve (46) alleviates pneumatic pressure toward the atmosphere.

The activation of the pneumatic bistable electrovalve (45) is produced by circulating of a brief electric current pulse in a certain "on" direction, by the solenoid (53) that surrounds closely the external surface of the hermetic tubular room (47).

Externally fixed in the top end of said room (47), a magnetic retention mean (54) as for example a permanent magnet, is able to overcome the weight force of the mobile nucleus (48), if it has risen enough to reach the magnet's influence field. By means of such disposition, the pneumatic bistable electrovalve (45) can be indefinitely retained in an open state, without any current circulation through the solenoid (53).

The electro-valve dimensioning also must allow that, being the solenoid excited by a brief current pulse of inverse or "off" polarity the retention be nulled, falling down the nucleus by effect of its weight until reaching the closing position, state in which it can of course remain indefinitely without any further energy consumption Also tightly fixed in said top cover, additional actuating means comprise an unidirectional expansion valve (55) optionally disabled; the vacuum conduit (56) communicant with a vacuum actuated liquid chemigation doser (57); and the irrigation water input conduit (58) connected with the controllable input flow regulator device (17) already mentioned.

Additionally installed in said cover (15), an operative state sensor (59) of non-contact type as for example a Hall effect device, is able to detect the stand by or filled operative states, proximity sensing a mean of magnetic marker (60) mounted on the controllable floating device (20) already mentioned, to provide feedback to the command circuits.

Figure 5:
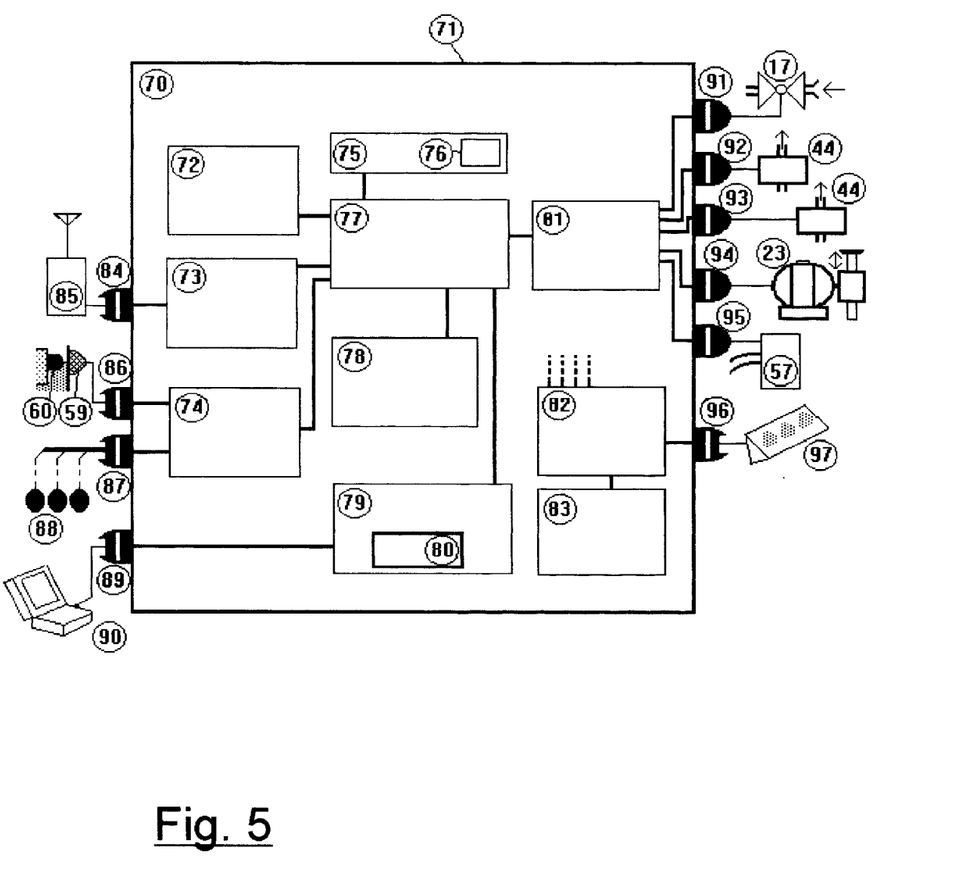
FIG. 5 functional block outline of a preferred implementation of the command module according to a general configuration.

The determination and automatic execution of the irrigation process cyclically realized by the Invention, constitutes the responsibility of the watering command assembly (4) previously mentioned, illustrated in FIG. 5.

As observed, the watering command assembly (4) comprises an electronic low power command module (70) with very low electric consumption, able to process information to determine the characteristics of the watering cycle and opportunely emit excitatory low energy electric signals in order to implement its execution; said electronic low power command module (70) comprisinging a water-tight sealed cabinet (71), containing at least a first circuit for attending local controls (72); a second circuit (73) decoder of remote control signals; a third circuit (74) conditioner of sensor originated signals and a fourth real time clock circuit (75) fed with an independent power source (76); said four circuits being connected to provide information to a fifth circuit (77) of logical processor, this circuit of logical processor being bidirectionally connected with a sixth circuit (78) of permanent memory containing the operative program; and with a seventh circuit (79) of rewritable memory comprising an eighth circuit (80) of non-volatile removable memory chip; the logical processor circuit (77) above mentioned, being connected with a ninth interface output circuit (81) providing excitation signals to the actuating devices already mentioned.

The above mentioned circuits are implemented with a minimum energy consumption electronic technology type as for example CMOS, being energized by a tenth power circuit (82), connected to receive electric power from an external autonomous low maintenance source, as for example a photovoltaic converter (97), designed with enough capacity to assure the autonomous operation of the mentioned watering command assembly in the most unfavorable solar condition case; this feeding circuit being also connected to an electric accumulator mean (83), designed to guarantee an autonomous operation of said watering command assembly, during an adequate period of time in the event of temporary reduction of energy provision by the above mentioned low maintenance source.

The cabinet (71) formerly mentioned presents fixed connection means to receive signal inputs coming from external elements, i.e.: connector (84) with the output signal of a remote control receiver circuit (85); connector (86) with the opertive state sensor (59) included in the watering actuator assembly (3); connector (87) with a plurality of sensors (88) to receive feedback information from the cultivation and its environment; and connector (89) with external reprogramming means for example a portable computer (90).

Said cabinet (71) also presents emerging connection means to direct output signals to external actuators, i.e.: connector (91) with the input flow regulator (117); connectors (92) and (93) with trigger discharge devices (44) acting over the filling controller subset (16) and the discharge actuator subset (24), respectively; connector (94) with the vertical displacement servomechanism (23) in the positionable watering actuator assembly (3); and connector (95) with the vacuum activated chemigation doser (57).

Finally, a connector (96) allows the electric power etrance fro m the externa l means of photovoltaic converter (97).

The watering distribution network (5) former mentioned, is connect ed to receive liquid from the discharge conduit (27) belonging to the positionable watering actuator assembly (3), present ing a discharge flow regulating valve (100), continued by at least a primary branch (101) and a plurality of secondary branches (102) derived from the ffst one, generally having ample section passages and low ruggedness in its inside walls; presenting said secondary branches (102) a plurality of emitter holes (103), each one of them generally having fixedly inserted a small longitude emitter conduit (104), being the inside passage section of said holes and conduit, significantly smaller than the inside section of the secondary branches (102) above mentioned, but yet with enough dimension—generally with diameter of a few millimeters—to allow the quick evacuation toward the plants of the local portion of the watering liquid discharged.

DESCRIPTION OF THE OPERATION

The operation of the described structure is next exposed, focusing in the performance of a local subsystem (1).

Being established the necessity by the controlled level regulator (18), the water enters with a flow value determined by the input flow regulator (17), to the recipient (14) of the watering command assembly (4). Being connected the flexible hydraulic connection (12) to use the option of capacity extension by means of an external auxiliary tank, the liquid fills progressively in the deposit (2), serving the recipient (14) as a mirror of the level reached in that deposit The watering a ctuator assembly (3) is vertically positioned with the aid of the pointing device (22) in reference to the vertical ruler (11), to a height equivalent to the volume of liquid desired to be dicharged during each cycle.

When the level in both recipients reaches the top filling level value (21) set by the level regulator (18), the controllable floating device (20) activates the shut-off valve (19), stopping the filling and this way putting an end to the load phase comprised in the preparation subcycle, to initiate the wait phase. The necessary condition for a correct operation is that the trigger discharge device (44) remains retained in closing position, and the filling level control conduit (43), is fixedly shut.

It must be remarked that the regulated filling level (21) reached by the liquid should be constructively established, as is illustrated in FIG. 3, in an intermediate value among the threshold to basic spontaneous discharge UDB (40) and the global spontaneous discharge threshold UDG (41) settled down by the addition of two phenomenons, that is:

1) the formation of a column of water in the space left between the exit tube (35) and the third inverted glass (34) of the elbow sector (30) with the collaboration of supplementary input threshold device (28); and
2) the presence of liquid in the space comprised between the bottom end of the exit tube (35) and the up glass (36) included in the supplementary discharge threshold device (29), what forces the air displaced by the liquid looking for discharging, to overcome an over pressure threshold equivalent to the height reached by this liquid.

In consequence, the reached wait state is characterized by an indefinitely stable equilibrium, based on a condition of an unsurpassable (without further external actions) threshold of potential energy as pressurization of the air caught in the camera (31) belonging to the device (28).

While, the watering command assembly (4) has determined the just moment to execute the discharging part of the cycle, by processing data of the cultivation as for example soil humidity and temperature; ambient parameters as for example temperature, humidity and atmospheric pressure; and also acquiring the operation status of the watering system; these data being manually set, programmed or provided by the sensors (88) and (59).

In order to make its calculus, the command assembly considers data that is a characteristic of the cultivated species joint with desirable evolutionary parameters according to the time elapsed from the initial planting date; these data being for example incorporated in the Expert application software that resides residing in the memory means (78), (79) and (80) of the electronic low power command module (70). The electronic circuit carries out the above calculation in few miliseconds, remaining almost all of time in a low consumption stand by condition. Only the real time clock circuit (75) remains active thanks to the independent power source (76).

When the current time reaches the calculated value, the awakening of the necessary circuits takes place in order to produce the execution of the discharge. Once executed and after a new calculation, the command module (70) returns to the stand by state with minimum energy consumption.

Being very small, the electric energy required for this kind of operation is easily supplied along the watering cycle and surely reserved duing several days or weeks by means of the photovoltaic converter (97) and the electric accumulator (83).

Once reached the moment calculated for make the discharge or properly watering phase, the interface output circuit (81) sends an unique and brief (some tenths of milliseconds long) current pulse of appropriate polarity, toward the actuators optionally configured as active; in this example limited to the discharge actuator subset (24) and specifically to the trigger discharge device (44), positioning in an auto-retained open state, the pneumatic bistable electrovalve (45).

In this position, the pressurieed air that was formerly caught in the camera (31) escapes.

So disappeared the support of the supplementary threshold (38) and—being filled with liquid the tube (35)—being nulled the supplementary threshold of discharge UD (39), it becomes broken the previous stable balance.

In fact, everything happens as if the threshold of spontaneous discharge had decreased suddenly from its former value UDG (41) to the new value UDB (40), lower than the current regulated filling level (21) of the liquid in the container and recipient. The result is a neat shot of the discharge process through the discharge actuator subset (24) which during discharge, acts as a conventional siphon device.

However, it would operate defectively without the intervention of further auxiliary mechanisms that are included in the Invention.

It is well known the fact that the normal operation of the conventional siphon device requires the complete purge of the air possibly caught in the hydraulic circuit and particularly in the area of the elbow. Without this proceeding, or if an air filtration takes place, the discharge would be surely aborted.

This operating error is prevented by the hermetic closing of the recipient (14) by means of the superior cover (15), and specifically by the action of the unidirectional expansion valve (55), only necessary when being used the option of external auxiliary tank as is the present implemented example of the Invention. Indeed, this valve allows the normal evacuation of the displaced air as the loading of the recipient (14) and the deposit (2) takes place, but its entrance is not allowed when the discharge proceeds, assuring the complete transmission of the suction taken place by the descending mass of liquid, until its complete emptying.

A similar phenomenon happens in the first moments of the discharge shot, when a sudden sign change of the pneumatic pressure into the watering actuator takes place. Indeed; once produced the opening of the pneumatic bistable electrovalve (45), the air over pressure in the camera (31) descends toward the atmospheric value, but as the discharge process is triggered, in a few seconds this pressure continues descending reaching a negative value equivalent to the height of the liquid accumulated in the deposit (2). If this electro-valve does not transition quickly to the closing state, the entrance of air due to the mentioned phenomenon would interrupt the discharge. Accordingly, the command module can be programmed to send a current pulse with closing polarity a brief delay after the beginning of the discharge. This characteristic preserves the control capacity over the duration of the discharge for the command group, being been able to use this option to adjust by this procedure the actual volume to discharge in the current cycle, without varying the vertical position of the watering actuador (3).

However, a more exact and general solution is obtained by means of the unidirectional pneumatic retention valve (46) comprised in the trigger discharge device (44). Said valve (46) doesn't interfere with the trigger phase in which the air circulates in the allowed sense, but it cuts the flow as soon as this is inverted, assuring the continuity of the discharge until its end. Although all control becomes lost during the discharge, the resultant benefit is positive, being gotten a very sure time margin to restore the closing of the electro-valve (45) without risk of doing it prematurely. By allowing both possibilities, the Invention will be able to adapt its configuration to the most convenient control strategy.

Beyond avoiding said inconvenient phenomenon of pneumatic depression in the actuator, the present Invention extrac advantages, by using it to add concentrated liquid agrochemicals, by means of a chemigation doser (57) of the vacuum actuated, through the vacuum conduit (56). Said incorporation takes place under favourable conditions, i.e.:

1) Use of small volume of concentrated liquid;
2) The chemicals addition takes place only during the discharge, discarding processes of chemical degradation or formation of colonies of microorganisms in still water;
3) The addition of the desired quantity of chemicals (i.e. liquid fertilizer), is progressively distributed along a plurality of watering events. The dosage is this way strictly proportional to the total volume of water discharged during a relatively long period of time. This fact allows the user to adapt ecologically the given dose, to the rhythm of absorption that is adequate to the system cultivation-soil.
4) Incorporation in the most turbulence point, assuring a homogeneous mixture; and
5) Precise dosage, because of being the vacuum law against time, only finction of constant dimensional or stable operative parameters.

However, it is in the low hydraulic restriction presented to the discharge and distribution of the irrigation liquid, where the fertigation is specially improved by the present Invention, through decreasing drastically the risk of obturations.

Once being initiated, the discharge phase proceeds typically at high flow due to the low hydraulic losses presented to the circulation by the hydro-pneumatic siphon device (25) and the conduits (12) and (27).

The discharge flow regulating valve (100) allows to reduce this flow in case that the conditions of the soil absorption or the necessities of the cultivated species advise to do it, so increasing the application period of time.

Through this valve, the liquid enters in the watering distribution network (5), characterized by its low hydraulic restriction. The primary and secondary branches (101) and (102) low pressure demanded, may generally be implemented with low internal ruggedness and wide section plastic pipe, with the consequent low friction losses. The whole hydraulic restriction concentrates, then, in the emission points.

The emitter holes (103) may have sufficiently wide diameters, for example between 1,5 and 5 millimeters, as to eliminate the plugging risk, yet maintaining a restriction between 100 and 300 times bigger respect to that of the branches where they are practiced.

It should be remarked that it is indeed accepted in the specialized literature that with said emission holes dimensions, the obturation risk becomes practically null.[13]

The feasibility to practice in the pipe this holes with repeatedly equal dimensions (or following a predetermined compensation law) is industrially simple. So, it is reasonable to expect great similarity in the emitting holes (103) over the whole distribution network, with the consequent uniformity of the quantity of water fed to the plants, attained at a very low manufacturing cost.

This emitter holes (103) optionally can discharge through terminal emitting means (104) with generally greater hydraulic conductivity in comparison with that of said holes (103) (for example small microtube segments) whose function is to drive the liquid toward the most appropriate point as established by the case agronomic modality.

From the previous description, it arises clearly that the Invention is very appropriate for its employment in fertigation, being discarded all formation, fixation or obstruction risk to the distribution network by non-desired microorganism colonies.

Working as described, the Invention is able to usually operate in autonomous, repeated way for an indefinite lapse without necessity of attention, assuring an appropriate feeding to the plants under watering.

But still in the emergency of a complete fail in the electronic low power command module or its power source, the controller is able to continue operating exclusively on base of hydraulic principles.

To allow it, three simple operations must be done:
1.—Leave the pneumatic bistable electrovalve (45) in a retained shut position, or simply plug permanently the discharge control conduit (26);
2.—Remove the controllable floating device (20); and
3.—Adjust the input flow regulator (17) until achieving a small flow water entrance, so that the duration of the watering cycle is determined by the time necessary to this flow to fill the container until the level of spontaneous discharge.

If the recipient (14) has enough height as to allow that its content surpasses the level of spontaneous discharge previously defined, the loading will proceed slowly until, reached said level, the discharge takes place in an entirely similar form to the normal operation.

Similarly, successive cycles will be repeated indefinitely, with the unique difference that in this case the repetition rate is determined by said adjustment of the input water flow.

Variations Comprised in the Invention

The Invention includes a plurality of structural and operative variations that exceed the preferred embodiment described above.

For example, it was already mentioned that a pneumatic depression takes place in the camera (31) during the discharge and that it is necessary to not allowing the entrance of air that would interrupt it, by means of directional valves. However, this phenomenon may be positively employed in the Invention as a simple method to obtain a controlled interruption of the discharge and in consequence a control over the volume discharged, method that results alternative to that previously described. Indeed; if during the discharge process the watering command (4) produced the opening of the pneumatic electrovalve (45) (being in this case disabled the retention valve (46)), it would cause an air entrance and consequently the immediate stop of the watering pulse. Plus still, any means that during the discharge allowed the entrance of air to the camera (31), would have produce the same shut-off effect.

So, a device able to determine repeatedly the magnitude of the discharged volume could consist on a simple vertical pipe, flexibly communicated through its top end with said camera (31) and being its bottom end submerged down to certain depth in the water contained in the deposit. In such a way, the interruption will proceed as soon as the descending level of liquid frees the entrance of air through said bottom end of the mentioned pipe.

Further; an important and simplified variation of embodiment of the watering actuator assembly could consist in:
 A.—a filling controller subset physically separated from the discharge actuator subset and fixedly positioned near the top of the deposit as a simple floating shut-off filling level control device;
 B.—a discharge actuator subset also located in a fixed position in reference to said fix filling level; and
 C.—an adjustable discharge shut-off switch by means of the positionable pipe before noted.

In this implementation the operation is entirely similar to the previously described, except in that the filling level is fixed and coincident with the maximum capacity of the deposit, while the discharge proceeds until a minimum or interruption level determined by the bottom end of the mentioned vertical pipe.

Other embodiment variations—among the many possible ones—are enumerated next to the following titles:
WATERING SYSTEM Comprising one or more local subsystems, with or without link with a remote control central station.
LOCAL SUBSYSTEM DEPOSIT It may consist simply in the recipient comprised in the discharge actuator subset, or extend its capacity by means of an external deposit.

Said external deposit can be simple or built with a plurality of communicated recipients.
WATERING ACTUATOR The automatic cycle operation may be based on a controlled filling input flow together with an spontaneous discharge mechanism, without employment of any electronic command circuit. This way, the cycling irrigation frequency may be regulated by the magnitude of entrance flow, by filling level or by discharge triggered by air relief as previously explained.

The cyclic discharged volume may be controlled by pneumatic shut-off (minimum level control) or by vertical positioning of the actuator (maximum or filling level control); this vertical positioning being manual, automatic and/or by means of a closed-loop servo mechanism.

Depression activated ferti-irrigation dosage may be included as a standard basic embodiment.

WATERING COMMAND

Control of the total quantity of water fed daily to the cultivation through adjustments of volume discharged by cycle or of the frequency of the cycles.

Different configuration of the control variables: evening light sensors, clock calendar, actual demand of the cultivation, environmental conditions, watering history, expert system, productive plan.

Local and/or remote optional modes of control

Alarm and/or compensation for lack of entrance of water.

Autonomous feeding from solar energy conversion along with battery back up; or from dry batteries; or from the electric net.

DISTRIBUTION NETWORK

Emission pipes comprising simple holes, optionally added with microtubes; or any kind of porous conduits or tapes; or other emitter means presenting low hydraulic restriction.

Feeding individual plants located in soil, set in containers or inclusive through filling furrows.

From what was explained above, it can be seen that the present Invention allows to use, by means of minor variations, a unique basic implementation of watering controller in applications requiring different performance levels, but in all the cases fulfilling the proposed finalities.

In a same way it also arises clearly that the present Invention comprises a sole and unique main object, nevertheless its versatility and the wide spectrum of embodiments with which it can be industrially manufactured.

Said unique structural principles that constitute the main object of the present Invention are remarked in the following paragraph.

The main object of the Invention

The hierarchical array of main structural principles that characterizes and provides novelty to the Invention is:

A SELF-SUSTAINED ECOLOGICAL IRRIGATION SYSTEM integrated by one or more local subsystems, each local subsystem comprising:

a) a water container having enough capacity to contain the total volume of water to be discharged during one watering cycle, hydraulically joined to b) a positionable watering actuator assembly that includes:
  b.1. a filling controller subset integrated by:
    b.1.1. an input flow regulator; and
    b.1.2. a controlled level regulator;
    b.1.3. a limited capacity hermetic recipient or body;
    b.1.4. an expansion valve;
    b.1.5. a capacity expansion shuttable connector; and
    b.1.6. a vacuum conduit connection to a chemigation doser;
  b.2. a discharge actuator subset comprising:
    b.2.1. a hydro-pneumatic siphon device;
    b.2.2. a supplementary input threshold devise; and
    b.2.3. a supplementary discharge thershold device;
  b.3. a trigger discharge device; and
  b.4. a vertical displacement servomechanism;
c) a watering command assembly, comprising:
  c.1. a low power command module;
  c.2. a plurality of feedback sensors;
  c.3. a plurality of electrical pulsed control output means;
d) a low hydraulic restriction watering distribution network, comprising:
  d.1. a plurality of central or feeding branches, feeding
  d.2. a plurality of emitting or peripheral conduits presenting
  d.3. a plurality of local emitting orifices; each one watering through
  d.4. terminal located emitting means.

Being so defined the mentioned main principles of the Invention it must be stressed that, besides the described options, the industrialization and/or marketing processes may give place to minor additional constructive modifications that will not appart from the protection sphere clearly stated by the following array of claims.

Bibliographic References

[1] Pizarro, Femando "Riegos localizados de alta frecuencia"; Madrid, España.

[2] Nijensohn, León; "El riego por goteo como método de lavado de suelos salinos"; Seminario Internacional sobre Riego por Goteo; IICA (OEA); Mendoza, Argentina, abril de 1975.

[3] Pizarro Cabello, F.; Op. cit.; p.p. 150

[4] Rodrigo López, Jesús et al. "Riego Localizado". Mundi-Prensa, Madrid, 1992; p.p. 171

[5] Pizarro Cabello, F.; Op. cit.; p.p. 161.

[6] Israelsen, Orson W.; "Principios y aplicaciones del riego", Ed. Reverté, 1985.

[7] Sagi, G. et al; "Clogging of Drip Irrigafion Systems by Colonial Protozoa and Sulfur Bacteria"; p.p. 244, Proc. of 5th. Microirrigation Congress, April 1995, Orlando, Fla., U.S.A.; American Society of Agricu Engineers.

[8] Dalvi, V. B. et al; "Growers' Experiences and On-Farn Microirrigation Efficiencies"; p.p. 775; Proc. cit.

9 Pizarro Cabello, F., Op. cit., p.p. 373.

[10] Pizarro Cabello, F.; Op. cit.; p.p. 323.

[11] Spencer Lloyd; U.S.Pat. No. 3,797,741; 1974; Abstract; U.S.P.T.O.

[12] Desrues, E; Chaumontet, B. & Lemery, J. P.; French Patent FR 2.665.051; 1992; INPI

[13] Edling, R. J. & Gaspard, M. J.; "Solar Power Supply System Design for Irrigation Control at Remote Sites"; p.p. 223; Proc. cit.

[14] Rodrigo Lbpez, J. et al; Op. cit.; p.p. 32.

What is claimed is:

1. A self-sustained ecological irrigation system capable to produce repeated cycles of uniform located irrigation into a cultivated area, of the type comprising a plurality of local subsystems (1) assisting generally different and physically apart cultivated areas; said local subsystems being linked with a central station (6) to receive remote control; said central station comprising codifying, adressing and transmitter circuits capable to send remote control orders with sufficient energy to be received by the adressed local subsystems (1); characterized in that each one of said local subsystems (1) comprises a liquid container (2) with enough capacity to contain at least the total water volume to be irrigated during one cycle, being the container (2) hydraulically joined from its bottom zone with a positionable watering actuator assembly (3); said positionable watering actuator assembly (3) being by one side electrically connected to receive control signals, with a watering command assembly (4) capable to determine the characteristics of the watering cycle and command their execution; and being by the other side hydraulically joined to feed a low friction losses watering distribution network (5), capable to subdivide uniformly the discharged volume of liquid and emitting it in located points into the cultivation area; said positionable watering actuator assembly (3) comprising a recipient hermetically closed by a top cover; said recipient including a first filling controller subset (16) driven by the relief of pressurized air, able to controllably limit the irrigation water entrance to the recipient from an external source; a second discharge actuator subset (24) providing at least one dimensionally defined threshold level of controlled triggerable discharge driven by the relief of pressurized air; being said discharge actuator subset (24) able to transit abruptly fiom a closing state to another of full open passage with low friction losses, if being surpassed said threshold by the current level of the liquid; both first and second subsets being fixedly height positioned one relative to the other, in funtion of the desired relationship among the designed filling and discharge threshold levels already mentioned; said positionable watering actuator assembly also comprising externally fixed to the top cover of said recipient, at least one trigger discharge device (44) able to relieved pressurized air, connected to control at least one of the above mentioned subsets; said trigger discharge device (44) presenting meanss of electrical connection to receive from said watering command assembly (4), impulsive activating signals for change of state; said positionable watering actuator assembly (3), at last comprising a mechanism for vertical positioning of itself in reference to the desired level of filling of the mentioned container (2).

2. A self-sustained ecological irrigation system as claimed in 1, characterized in that the mentioned filling controller subset (16) comprises a first device (17) of input flow regulator; a second device (18) of controlled filling level regulator comprising a shut-off valve activated by a controllable floating device; said controllable floating device including at least one bottom opened air trapping camera, being said camera top provided with a pneumatic air reliefing connection; said pneumatic air reliefing connection emerging from the recipient through its top cover, being able to be optionally sealed or connected with the trigger discharge device (44) former mentioned to control the filling level of the container (2); the mentioned recipient also presenting at its bottom zone a capacity expansion shuttable connector, able to fix a flexible conduit of adequate section to conduct with low hiydraulical losses the discharge flow coming from the mentioned container (2); being additionally fixed in said top cover an unidirectional pneumatic valve (46) optionally set in a permanent shut state, capable to retain a partial pneumatic depression produced during the discharge process inside the recipient; further presenting fixed in said top cover the emergent connection of at least one aspiration conduit able to admit the incorporation of liquid agrochemical additives, being the opposite end of said aspiration conduit connected with depression activated doser means.

3. A self-sustained ecological irrigation system as claimed in 2, characterized in that said device (17) of input flow regulator comprises a liquid doser mean electrically adjustable by electric signals, this signals being provided by the watering command assembly (4) previously mentioned.

4. A self-sustained ecological irrigation system as claimed in 1, characterized in that the mentioned discharge actuator subset (24) comprises a hydro-pneumatic siphon device (25) comprising three hydraulically consecutive parts, being: a first ascending part called input sector, a second intermediate part (30) called elbow sector, and a third descending part called discharge sector; presenting connected in series wit said ascending part a device (28) provider of a supplementary input threshold (UT); being said elbow sector (30) a hydraulic device able to invert the ascending sense of the liquid circulation through a progressive section transition providing laminar flow and precise definition of an irreversible triggering transition level to discharge, called threshold to basic spontaneous discharge (UDB); being said third descending part connected with a hydraulic device (29) provider of a supplementary discharge threshold (UD); the whole hydropneumatic siphon device (25) presenting a precisely defined global spontaneous discharge threshold level (UDG), equivalent to the sum of said threshold to basic spontaneous discharge, added with both two mentioned supplementary thresholds (UDG=UDB+UT+UD); said hydropneumatic siphon device (25) comprising at least one pressurized air camera (31) sustaining without discharge the pressure generated by a liquid level into the recipient of a value between the former mentioned thresholds of basic (UDB) and global (UDG) spontaneous discharge levels; said pressurized air camera (31) presenting in its top zone a pneumatic control connection, able to allow the evacuation of the trapped air to trigger the hydraulic discharge process through said siphon device (25) and discharge conduit (35).

5. A self-sustained ecological irrigation system as claimed in 1, characterized in that said trigger discharge device (44) by relief of pressurized air comprises at least a pneumatic bistable electro-valve (45), able to evacuate said trapped pressurized air while staying at a self-retained open state, from said filling controller and discharge actuator subsets in order to execute its control; said electro-valve (45) comprising a pneumatic circuit including an unidirectional pneumatic valve optionally disabled; and at least a magnetic loop circuit energized by a high inductance solenoid winding able to be electrically activated by a suitable current pulse provided by the watering command assembly (4) already mentioned; said magnetic loop circuit closing partially through a mobile magnetic nucleus as it moves limitedly when forced by a magnetic field; said magnetic field being established by the circulation of a brief electric current pulse through the above mentioned solenoid winding; being included in said magnetic loop circuit at least a retention mean of the mentioned mobile nucleus in its open position, still in absence of the activating current; said mobile magnetic nucleus including at least a resilient seal mean able to controlably close the passage of pressurized air through the former mentioned pneumatic circuit.

6. A self-sustained ecological irrigation system as claimed in 1, characterized in that the already mentioned waterig command assembly (4) comprises an electronic command module (70) with low electrical power consumption, capable to process informaion to determine the parameters of the watering cycle and at the proper time emit activating low energy control signals to execute it; said electronic command module (70) comprising a water tight sealed cabinet, housing at least a first circuit for attending local controls; a second circuit decoder of remote control signals; a third circuit conditioner of sensors and a fourth real time clock circuit backed by an independent power source; the four circuits mentioned being connected to provide information signals to a fifth circuit of logical processor; this circuit of logical processor being bidirectionally connected with a sixth circuit of permanent memory container of an operative program; said four circuits being also connected with a seventh circuit of recitable memory, which in turn includes an eighth circuit of non-volatile removable memory chip; said circuit of logical processor being connected with a ninth interface power output circuit to exit impulsive watering control signals; said interface including a servo-mechanism control circuit capable to adjustably command the vertical positioning of the positionable watering actuator assembly previously mentioned; the above circuits being implemented by means of minimum power consumption electronic technology and energized by a tenth power circuit connected to receive electric power from an external autonomous power source (76) requiring low maintenance, comprising a mean of photovoltaic converter (97) dimensioned with enough capacity to assure the autonomous operation of the mentioned watering command assembly (94) yet in the most unfavorable case of solar condition; said tenth power circuit being also connected to a mean of rechargeable electric accumulator (83), dimensioned to guarantee the autonomous operation of the watering command assembly during an sufficient long period of time in the event of temporary reduction of energy provision by said external autonomous power source (76); presenting the sealed cabinet before noted a plurality of connection means with external circuits; said external circuits comprising at least means of local control, a remote control receiving circuit, and a plurality of sensor means capable to acquire feedback information originated at the cultivation, at the environment or at the watering process itself; being output control signal connection means of said low power command module also connected to the positionable watering actuator assembly (3) former mentioned.

7. A self-sustained ecological irrigation system as claimed in 1, characterized in that said watering distribution network (5) comprises in first place a discharge flow regulating valve (100), continued for at least one primary feeding branch (101), which in turn is connected with a plurality of derived secondary peripheral emiting branches (102); said secondary feeding branches having practiced a plurality of emitter holes (103) of a significative bigger size than the biggest particles present in the irrigation water; being said holes still enough sized to allow the quick evacuation toward the cultivation of the located portion of the discharged volume; being the hydraulic restriction exercised by said emitter holes (103) significantly larger than that of the the above mentioned secondary peripheral emitting branches; having inserted each one of said holes, terminal watering emitter means (104) presenting generally smaller hydraulic restriction than that of the mentioned emitter holes.

\* \* \* \* \*